No. 679,705. Patented July 30, 1901.
P. T. SIEVERT & R. HEIKEL.
APPARATUS FOR USE IN THE MANUFACTURE OF SHEET GLASS.
(Application filed Jan. 16, 1899.)
(No Model.)
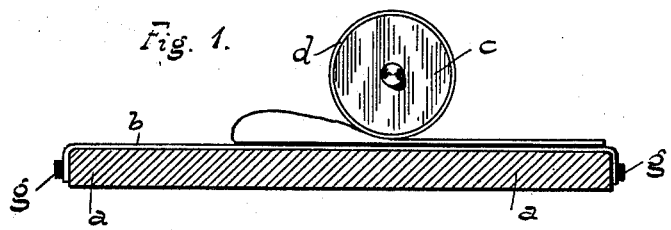
Fig. 1.
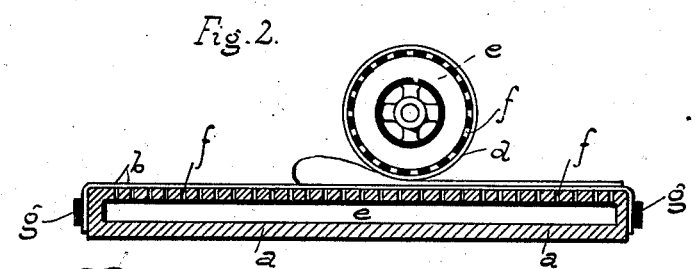
Fig. 2.
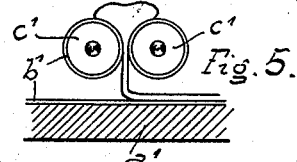
Fig. 5.
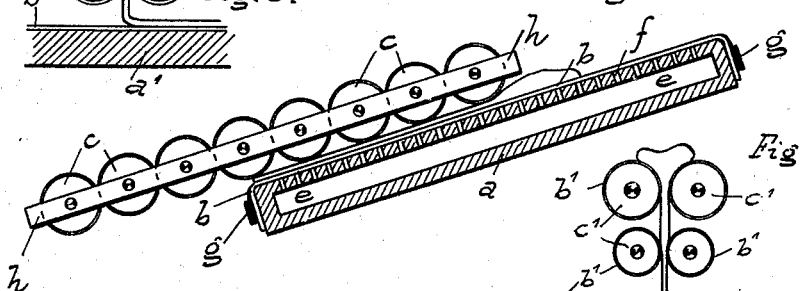
Fig. 3.
Fig. 6.
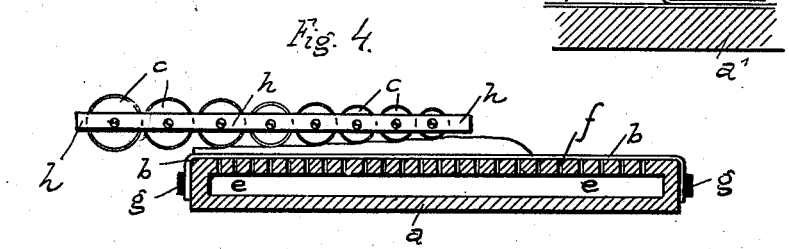
Fig. 4.
Witnesses:
Inventors
Paul T. Sievert,
Robert Heikel,
By Wm E Boulter,
Attorney

UNITED STATES PATENT OFFICE.

PAUL THEODOR SIEVERT, OF DRESDEN, AND ROBERT HEIKEL, OF DEUBEN, GERMANY; SAID HEIKEL ASSIGNOR TO SAID SIEVERT.

APPARATUS FOR USE IN THE MANUFACTURE OF SHEET-GLASS.

SPECIFICATION forming part of Letters Patent No. 679,705, dated July 30, 1901.

Application filed January 16, 1899. Serial No. 702,309. (No model.)

*To all whom it may concern:*

Be it known that we, PAUL THEODOR SIEVERT, residing at Dresden, and ROBERT HEIKEL, residing at Deuben, near Dresden, in the Empire of Germany, subjects of the King of Saxony, have invented a certain new and useful Improvement in Apparatus for Use in the Manufacture of Sheet-Glass, (for which applications have been made for Letters Patent in Great Britain, filed December 22, 1898; in Germany, filed August, 1898, and November 24, 1898; in France, filed October 31, 1898; in Belgium, filed October 31, 1898; in Austria, filed December 12, 1898, and in Hungary, filed December, 1898,) of which the following is a specification.

This invention relates to a process for manufacturing sheet or plate glass by compression or rolling between surfaces of soft permeable material which allow water to pass through—such as paper, wood-pulp, asbestos, cellulose, &c.—as well as to apparatus for carrying said process into effect.

The invention consists in the arrangement of solid or hollow metal plates and rollers the surface of which is covered by a soft permeable material, so that glass still in its plastic moldable state is brought in contact with said fibrous material.

The invention offers the advantage that glass plates rolled or compressed between non-cooling fibrous substances become very smooth and transparent and may be made of a hitherto-unattainable thinness.

In the accompanying drawings, Figure 1 shows a metal plate and metal roller covered with fibrous material. Fig. 2 shows a hollow metal plate and hollow roller provided on the surface with perforations, both being covered with fibrous material. Fig. 3 shows an inclined hollow metal plate provided with a fibrous covering and a series of small rolls supported in a frame. Fig. 4 shows a hollow metal plate with a fibrous covering and a series of rolls of gradually-increasing diameter. Fig. 5 shows two rolls covered with fibrous material serving to roll a mass of plastic glass into a plate or sheet and deposit it on a plate also covered with fibrous material. Fig. 6 shows two pairs of rolls, the rollers of each pair being arranged at different distances apart, in combination with a plate for the same purpose as in the preceding figure.

In Fig. 1, $a$ is a solid metal plate on which is placed a thin layer or covering $b$, of fibrous material. The roller $c$ is also provided with a fibrous layer $d$. When manufacturing glass plates, the molten mass of glass or a glass plate which has been subjected to preliminary rolling or pressing is placed on the plate $a$. In many cases the cool temperature of the metal will be sufficient to prevent the burning of the fibrous layers $b\ d$, more particularly when the metallic parts covered by them are hollow, so that they may be continually cooled by water, steam, air, &c.; but it is advisable to moisten the fibrous layers $b\ d$ with water or other cooling liquid, so that at first the liquid is vaporized and at the same time or after evaporation has stopped the cooling temperature of the metal surfaces comes into play. The moistening of the fibrous layers may be conveniently effected by providing the metal plates and rollers with recesses or hollow spaces $e$, from which passages or perforations $f$, Fig. 2, extend to the surface on which the fibrous material is placed, which are thus supplied from within with water or steam for the purpose of moistening the fibrous material. The latter is preferably used in the shape of a fabric secured to the metal surface $a$ by means of a frame or clamp $g$.

On the contact of the moist fibrous layers with the glass air-bubbles are often formed in the glass, and in order to get rid of them there is arranged according to this invention a series of small rollers $c$, supported in a frame and employed to roll the glass until it loses its plasticity by cooling. Instead of one or two large rolls, as hitherto used, there are in this case six to eight small rolls, which are all simultaneously in contact with the mass or sheet of glass, so that the contact takes place successively (in point of space) at short distances apart, and the glass plate is continually worked, so that a bubble or blow-hole that may be formed is at once destroyed by the next roll, until the glass is cooled to such an extent that no more bubbles can be produced. It is in some cases advantageous to arrange the metal plates used as a rolling-table in an inclined position, (shown in Fig. 3,) so as to cause the glass to press against the rolls by the influence of its own weight.

As shown in Fig. 4, the rolls combined in the frame $h$ may be arranged in a gradually-decreasing distance from the roll-surface either by arranging rolls of the same diameter in an inclined plane in the frame or by placing rolls of gradually-increasing diameter in one parallel plane. In this way the mass of glass placed on the table is gradually rolled thinner and thinner, and only the last roll produces a smooth and perfect glass plate of a much smaller thickness than has been possible hitherto.

In all the cases described in which the working is effected by means of a plate and rolls it is advisable to pour out the hot molten mass of glass first on a bare metal plate adjoining that covered with fibrous material and then to roll it over onto the latter. In this way the glass slightly cools before reaching the fibrous material, which is thus protected from injury.

The process, in itself well known, of pouring glass between two rotating rolls, Fig. 5, which roll it into a plate and deposit on a plate $a'$, may be also employed. The rolls $c'$, as well as the plate $a'$, are also covered with a surface layer $b'$, of fibrous material.

Several pairs of rolls $c'$ $c'$ at different distances apart may be arranged, Fig. 6, in order gradually to roll the glass plate thinner and thinner and to deliver it on the plate $a'$, the glass coming in contact only with the fibrous layer $b'$.

A pair of non-covered metallic rolls may be used over the rolls $c'$, covered with fibrous material, so as to cool the glass slightly before allowing it to come in contact with the fibrous surfaces.

We claim—

1. The combination of two coacting surfaces between which molten glass is adapted to be placed and by which said glass is subjected to pressure and a fibrous covering on the coacting faces of said surfaces each of said surfaces being constructed to permit a liquid or steam to be brought in contact with the covering from the under side of the latter.

2. The combination of two coacting hollow bodies, having perforations extending from the interior to the outer surfaces, and a fibrous covering on the opposing faces of said bodies.

3. The combination of a perforated plate covered with fibrous material, with a series of rolls of different diameters supported one behind another in a frame substantially as described.

In testimony whereof we have hereto set our hands in the presence of the two subscribing witnesses.

PAUL THEODOR SIEVERT.
ROBERT HEIKEL.

Witnesses:
HERNANDO DE SOTO,
RUDOLF SCHMIDT.